United States Patent
Haraguchi et al.

(10) Patent No.: US 12,539,761 B2
(45) Date of Patent: Feb. 3, 2026

(54) INTERNAL STRUCTURE OF MOBILE OBJECT

(71) Applicant: TOYOTA BOSHOKU KABUSHIKI KAISHA, Aichi (JP)

(72) Inventors: Daiki Haraguchi, Aichi (JP); Hiroyuki Suzuki, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 18/911,869

(22) Filed: Oct. 10, 2024

(65) Prior Publication Data
US 2025/0121687 A1   Apr. 17, 2025

(30) Foreign Application Priority Data
Oct. 13, 2023   (JP) ................. 2023-177789

(51) Int. Cl.
*B60K 35/00* (2024.01)
*B60K 35/22* (2024.01)
*B60K 35/60* (2024.01)

(52) U.S. Cl.
CPC .............. *B60K 35/60* (2024.01); *B60K 35/22* (2024.01); *B60K 2360/66* (2024.01); *B60K 2360/771* (2024.01)

(58) Field of Classification Search
CPC .... B60K 35/60; B60K 35/22; B60K 2360/66; B60K 2360/771; B60K 35/21
See application file for complete search history.

(56) References Cited

U.S. PATENT DOCUMENTS

| | | | | |
|---|---|---|---|---|
| 6,633,347 | B2 * | 10/2003 | Kitazawa | B60K 35/50 348/837 |
| 7,490,887 | B2 * | 2/2009 | Vitito | B60K 35/28 348/837 |
| 7,992,928 | B2 * | 8/2011 | Kimizuka | B60Q 3/64 296/214 |
| 8,215,696 | B2 * | 7/2012 | Akiya | B60J 3/0204 160/370.21 |
| 8,410,379 | B2 * | 4/2013 | Kuno | B60N 2/0228 200/18 |
| 8,840,169 | B2 * | 9/2014 | Tanizawa | B60R 13/0206 296/146.7 |
| 9,156,388 | B2 * | 10/2015 | Nakanishi | B60N 2/688 |
| 9,815,426 | B2 * | 11/2017 | Hamada | B60R 13/01 |
| 10,479,319 | B1 * | 11/2019 | Wengreen | B60Q 5/005 |
| 10,493,952 | B1 * | 12/2019 | Schwie | B60Q 9/00 |
| 11,224,136 | B2 * | 1/2022 | Song | B60K 35/10 |
| 2006/0070103 | A1 * | 3/2006 | Vitito | B60R 11/0211 725/77 |
| 2019/0375321 | A1 * | 12/2019 | Yano | B60N 2/20 |

FOREIGN PATENT DOCUMENTS

| | | |
|---|---|---|
| JP | 2008-64889 | 3/2008 |
| JP | 7613931 B2 * | 1/2025 |

* cited by examiner

*Primary Examiner* — Philip P. Dang
(74) *Attorney, Agent, or Firm* — GREENBLUM & BERNSTEIN, P.L.C.

(57) ABSTRACT

A plate-shaped plate member capable of showing an image projected thereon is disposed along a ceiling of a vehicle, and a plurality of seats are disposed in the vehicle such that the height with respect to a horizontal plane gradually increases in a first direction. At least a part of the plate member slopes downward with respect to the horizontal plane in a second direction opposite to the first direction.

5 Claims, 4 Drawing Sheets

PATTERN: 1A

PATTERN: 2A

PATTERN: 3A

PATTERN: 4A

PATTERN: 5A

INTERNAL STRUCTURE OF MOBILE OBJECT

This Nonprovisional application claims priority under 35 U.S.C. § 119 on Patent Application No. 2023-177789 filed in Japan on Oct. 13, 2023, the entire contents of which are hereby incorporated by reference.

TECHNICAL FIELD

The present disclosure relates to an internal structure of a mobile object.

BACKGROUND ART

Conventionally, an invention is known in which a transparent glass roof fitted into a roof panel is configured to show an image projected thereon by a projector, to provide a user with information associated with actual celestial objects observed through the glass roof (e.g., Patent Literature 1)

CITATION LIST

Patent Literature

[Patent Literature 1]
  Japanese Patent Application Publication Tokukai No. 2008-64889

SUMMARY OF INVENTION

Technical Problem

However, even with the invention disclosed in Patent Literature 1, a passenger needs to largely tilt the seat to keep the eyes on the glass roof showing images projected thereon, so that it is difficult for the passenger to view images while traveling. In addition, a larger space is required to allow the passenger to tilt the seat, so that it is difficult to utilize this invention under conditions where the number of passengers is large.

An object of an aspect of the present disclosure is to enable a passenger to view images while traveling without tilting the seat largely or at all.

Solution to Problem

To achieve the object, a mobile object in accordance with an aspect of the present disclosure includes: a plate-shaped plate member disposed along a ceiling of the mobile object, the plate member being capable of showing an image projected thereon; and a plurality of seats disposed such that a height with respect to a horizontal plane gradually increases in a first direction, in which at least a part of the plate member slopes downward with respect to the horizontal plane in a second direction opposite to the first direction.

Advantageous Effects of Invention

According to an aspect of the present disclosure, it is possible to enable a passenger to view images while traveling without tilting the seat largely or at all.

DESCRIPTION OF EMBODIMENTS

Figure 1:
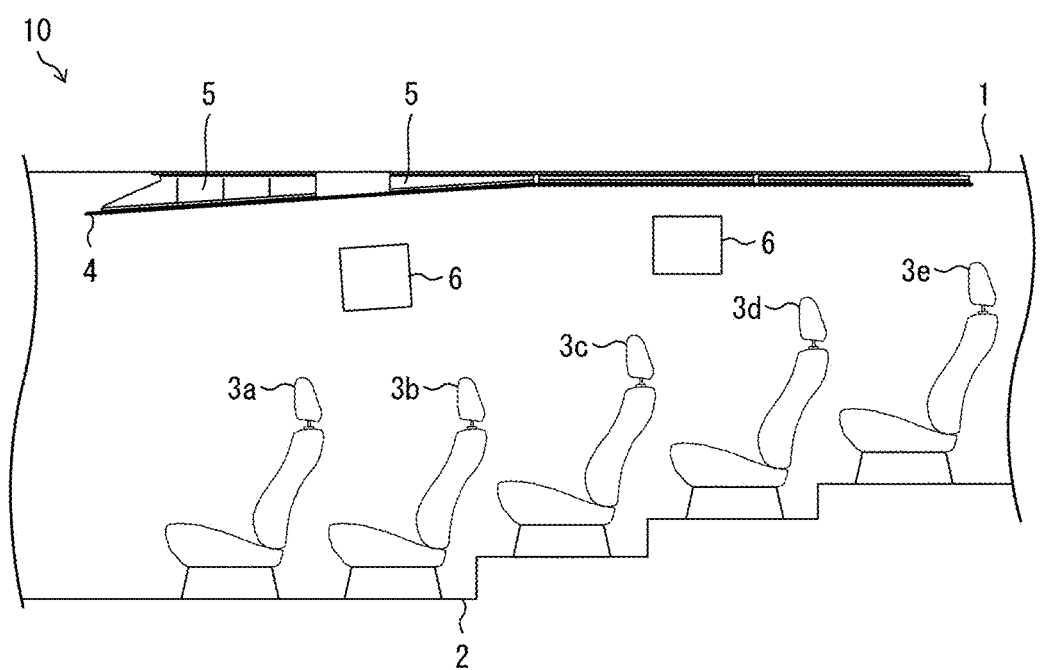
FIG. 1 is a diagram illustrating an example of the internal structure of a mobile object.
Figure 1:
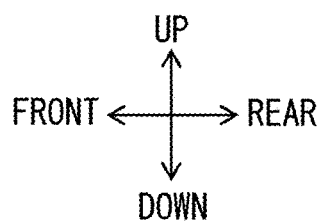

The following will describe the internal structure of a mobile object in accordance with an embodiment of the present disclosure with reference to the drawings. The drawings referred to in the following descriptions are schematic and do not necessarily show actual ones. For convenience of illustration and understanding, scales, ratios of the lengthwise and breadthwise dimensions, and the like may be altered from actual ones, and may be exaggerated. Same or equivalent components in the drawings are denoted by the same reference symbols and the descriptions thereof will not be repeated.

(Internal Structure of Vehicle 10)

FIG. 1 is a diagram illustrating an example of the internal structure of a vehicle 10 in accordance with the present embodiment. In the present embodiment, an example in which the vehicle 10 is employed as the mobile object is described, but the mobile object is not limited to the vehicle 10. Besides the vehicle 10, examples of the mobile object may include a ship, an aircraft, a spacecraft, and the like. Further, the vehicle 10 will be described as a bus hereunder, but this is not limited thereto, and may be a private car, a taxi, or any other vehicle. In FIG. 1, "front" indicates the frontward direction of the vehicle 10. "Rear" indicates the rearward direction of the vehicle 10. "Up" indicates the direction opposite to the direction in which gravity acts. "Down" indicates the direction in which gravity acts.

As illustrated in FIG. 1, the vehicle 10 includes a plurality of seats, that is, seats 3*a* to 3*e*. Specifically, the vehicle 10 is provided with the seat 3*a* in the front row, the seat 3*b* in the second row, the seat 3*c* in the third row, the seat 3*d* in the fourth row, and the seat 3*e* in the last row. Although the number of seats depicted in FIG. 1 is five, this is merely an example, and the number of sheets is not limited thereto.

In the present embodiment, the seats 3*a* to 3*e* are disposed on a floor surface 2 inside the vehicle 10 such that the height with respect to the horizontal plane gradually increases in the rearward direction of the vehicle 10. As used herein, the "horizontal plane" refers to a plane perpendicular to the direction in which gravity acts. Further, the "height with respect to the horizontal plane" may be defined as, for example, the height from a freely-chosen horizontal plane to the headrest of each seat. It should be noted that the height with respect to the horizontal plane only needs to gradually increase when the seats 3*a* to 3*e* as a whole are viewed from above, and thus, some of the seats may have the same height with respect to the horizontal plane. For example, in FIG. 1, although the height with respect to the horizontal plane of the seat 3*a* and that of the seat 3*b* are the same, the height with respect to the horizontal plane gradually increase when the seats 3*a* to 3*e* as a whole are viewed from above. Of course, all the seats may have different heights with respect to the horizontal plane. Assuming that the seat 3*a* to 3*e* have the heights h1 to h5, respectively, with respect to a freely-chosen horizontal plane, the seats may be arranged to satisfy h1<h2<h3<h4<h5.

Such an arrangement of the seats 3*a* to 3*e* may be expressed that "the seats 3*a* to 3*e* are situated in a stepped manner in the rearward direction of the vehicle 10", or alternatively, may be expressed that "the seats 3a to 3e are situated in an oblique arrangement in the rearward direction of the vehicle 10".

In FIG. 1, although the floor surface 2 is formed to be a stepped surface in the rearward direction of the vehicle 10, but this is not limited thereto, and may be formed to slope at a predetermined upward angle in the rearward direction.

On a ceiling 1 of the vehicle 10, two rails (not illustrated) extending in the front-to-rear direction are disposed, and a plate-shaped plate member 4 is attached to these rails.

In the present embodiment, at least a part of the plate member 4 slopes downward with respect to the horizontal plane in the frontward direction of the vehicle 10. As an example of a method of having the plate member 4 slope, a support member 5 for having the plate member 4 slope at a predetermined angle is mounted on the plate member 4, and the support member 5 is brought into engagement with the rails. As will be described in detail later, the plate member 4 may be a single plate member extending along the front-to-rear direction of the vehicle 10, or alternatively, may be a plurality of plate members may be disposed side by side along the front-to-rear direction of the vehicle 10.

A projection film (not illustrated) is affixed to the surface of the plate member 4, that is, the surface visible to passengers seated on the respective seats 3a to 3e. This enables the plate member 4 to show an image projected thereon by a projector 6 disposed inside the vehicle 10. However, if the surface itself of the plate member 4 is suitable for projection, the projection film may be eliminated. For example, the plate member 4 may be made of, but not limited to, fiber. For example, the projector 6 may be mounted on an inner side surface of the vehicle 10 as illustrated in FIG. 1, but not limited thereto.

The foregoing example has dealt with a case where at least a part of the plate member 4 slopes downward with respect to the horizontal plane in the frontward direction of the vehicle 10, but the slope may have several patterns. Therefore, the following will describe slope patterns, referring separately to a case where the vehicle 10 has the internal structure in which a plurality of plate members are provided and a case where the vehicle 10 has the internal structure in which a single plate member is provided.

(Slope Pattern in Case Where a Plurality of Plate Members are Provided)

Figure 2:
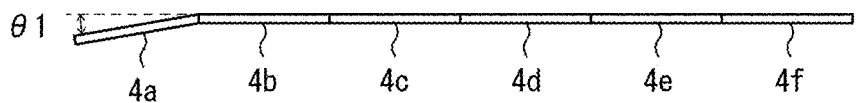
FIG. 2 is a diagram illustrating examples of the slope pattern of plate members.
Figure 2:
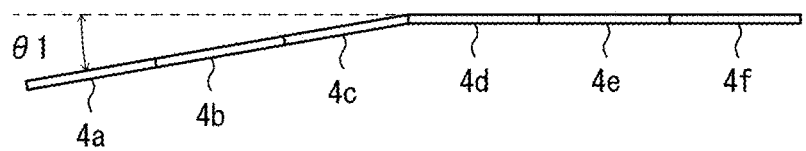
Figure 2:
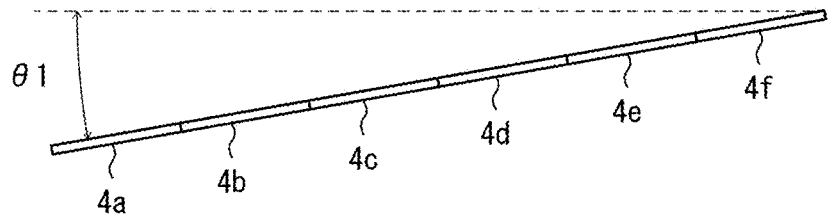
Figure 2:
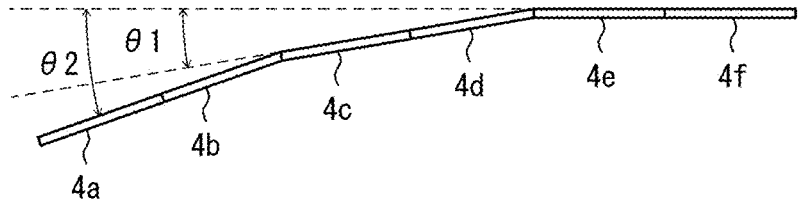
Figure 2:
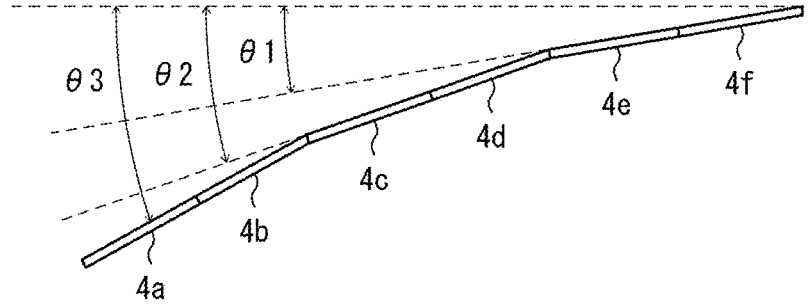
Figure 2:
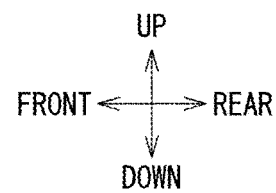

First, referring to FIG. 2, a description will be given of slope patterns in a case where the vehicle 10 has the internal structure in which a plurality of plate members are provided. Herein, the plurality of plate members are referred to as plate members 4a, 4b, 4c, 4d, 4e, and 4f in this order from the front of the vehicle 10 as illustrated in FIG. 2. That is, FIG. 2 depicts an example in which the vehicle 10 has the internal structure in which six plate members are provided. The plate member 4a is the "foremost plate member" and the plate member 4f is the "rearmost plate member". Here, the ceiling 1 and the support member 5 are omitted in FIG. 2, which illustrates only the plate members 4a to 4f.

As illustrated in FIG. 2 as pattern 1A, it may be configured so that, among the plurality of plate members 4a to 4f, only the foremost plate member 4a slopes downward with respect to the horizontal plane. Assuming that the slope angle in this case is $\theta 1$, the slope angle $\theta 1$ is not particularly limited to any specific angle, and the slope angle $\theta 1$ may be any angle as long as each of the passengers seated on the respective seats 3a to 3e can view an image projected on at least the plate member 4a at a comfortable neck angle. Here, it is assumed that the plate members except for the foremost plate member 4a, that is, the plate members 4b to 4f are disposed parallel to the horizontal plane along the ceiling 1 of the vehicle 10; however, some bus may have a curved ceiling 1. When the ceiling 1 is curved, the plate members 4b to 4f may be disposed to make a curve along the ceiling 1. That is, the plate members 4b to 4f excluding the foremost plate member 4a need not necessarily be disposed parallel to the horizontal plane.

Further, as illustrated in FIG. 2 as pattern 2A, it may be configured so that, in addition to the foremost plate member 4a, the plate members 4b and 4c slope at the slope angle $\theta 1$, which is the same as that of the plate member 4a. In this case, the plate members 4d to 4f are disposed parallel to the horizontal plane. It should be noted that what is combined with the foremost plate member 4a is not limited thereto. It may be configured so that two plate members 4a and 4b slope at the slope angle $\theta 1$. In this case, the plate members 4c to 4f are disposed parallel to the horizontal plane. Alternatively, it may be configured so that four plate members 4a to 4d slope at the slope angle $\theta 1$. In this case, the plate members 4e and 4f are disposed parallel to the horizontal plane. Alternatively, it may be configured so that five plate members 4a to 4e slope at the slope angle $\theta 1$. In this case, only the rearmost plate member 4f is disposed parallel to the horizontal plane.

Further, as illustrated in FIG. 2 as pattern 3A, it may be configured so that all the plate members 4a to 4f slope at the slope angle $\theta 1$. In this case, no plate member is parallel to the horizontal plane.

Further, as illustrated in FIG. 2 as pattern 4A, two different slope angles may be employed. The plate members 4a and 4b slope at a slope angle $\theta 2$. The plate members 4c and 4d slope at a slope angle $\theta 1$. Here, $\theta 2 > \theta 1$. In this case, the plate members 4e and 4f are disposed parallel to the horizontal plane. Thus, it may be configured so that the plurality of plate members 4a to 4f slope at two different angles. It should be noted that the combination of plate members are not limited to that illustrated as the pattern 4A. For example, the foremost plate member 4a may slope at the slope angle $\theta 2$ and the plate member 4b may slope at the slope angle $\theta 1$. In this case, the plate members 4c to 4f are disposed parallel to the horizontal plane. Alternatively, the plate members 4a to 4c may slope at the slope angle $\theta 2$ and the plate members 4d to 4f may slope at the slope angle $\theta 1$. In this case, no plate member is parallel to the horizontal plane. When one or more of the plate members 4a to 4f which include at least the foremost plate member 4a are referred to as a first plate member group, and one or more of the plate members 4a to 4f which are adjacent to the first plate member group are referred to as a second plate member group, the first plate member group and the second plate member group only need to slope downward with respect to the horizontal plane.

In view of the pattern 4A of FIG. 2, the plate members 4a and 4b form the "first plate member group", and the plate members 4c and 4d form the "second plate member group". The slope angle $\theta 2$ of the first plate member group with respect to the horizontal plane is greater than the slope angle $\theta 1$ of the second plate member group with respect to the horizontal plane. It should be noted that, as described above, the "first plate member group" may be constituted by a single plate member. Similarly, the "second plate member group" may also be constituted by a single plate member.

Further, as illustrated in FIG. 2 as pattern 5A, three different slope angles may be employed. The plate members 4a and 4b slope at a slope angle $\theta 3$. The plate members 4c and 4d slope at a slope angle $\theta 2$. The plate members 4e and 4f slope at a slope angle $\theta 1$. Here, $\theta 3 > \theta 2 > \theta 1$. In this case, no plate member is parallel to the horizontal plane. Thus, it may be configured so that the plurality of plate members 4a to 4f slope at three different angles. It should be noted that the combination of plate members are not limited to that illustrated as the pattern 5A. For example, the foremost plate member 4a may slope at the slope angle θ3, the plate member 4b slopes at the slope angle θ2, and the plate member 4c may slope at the slope angle θ1. In this case, the plate members 4d to 4f are disposed parallel to the horizontal plane. When one or more of the plate members 4a to 4f which include at least the foremost plate member 4a are referred to as a first plate member group, one or more of the plate members 4a to 4f which are adjacent to the first plate member group are referred to as a second plate member group, and one or more of the plate members 4a to 4f which are adjacent to the second plate member group are referred to as a third plate member group, the first, second, and third plate member groups only need to slope downward with respect to the horizontal plane.

In view of the pattern 5A of FIG. 2, the plate members 4a and 4b form the "first plate member group", the plate members 4c and 4d form the "second plate member group", and the plate members 4e and 4f form the "third plate member group". The slope angle θ3 of the first plate member group with respect to the horizontal plane is greater than the slope angle θ2 of the second plate member group with respect to the horizontal plane. The slope angle θ2 of the second plate member group with respect to the horizontal plane is greater than the slope angle θ1 of the third plate member group with respect to the horizontal plane. It should be noted that, as described above, the "first plate member group" may be constituted by a single plate member. Similarly, the "second plate member group" may also be constituted by a single plate member. Similarly, the "third plate member group" may also be constituted by a single plate member. Alternatively, all the plate members 4a to 4f may slope at different angles. In this case, assuming that the slope angles of the plate members 4a to 4f are θ6, θ5, θ4, θ3, θ2, and θ1, respectively, it may be θ6>θ5>θ4>θ3>θ2>θ1. The slope angle of the foremost plate member 4a is the greatest, and the slope angle of the rearmost plate member 4f is the smallest.

As described for the pattern 1A to 5A of FIG. 2, in the present embodiment, when the vehicle 10 has the internal structure in which the plurality of plate members 4a to 4f are provided, at least the foremost plate member 4a only need to slope.

(Slope Pattern in Case Where a Single Plate Member is Provided)

Next, referring to FIG. 3, a description will be given of a slope pattern in a case where the vehicle 10 has the internal structure in which a single plate member 4 is provided. Here, similarly to FIG. 2, the ceiling 1 and the support member 5 are omitted in FIG. 3, which illustrates only the plate member 4.

Figure 3:
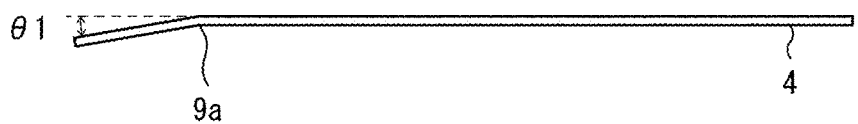
FIG. 3 is a diagram illustrating examples of the slope pattern of a plate member.
Figure 3:
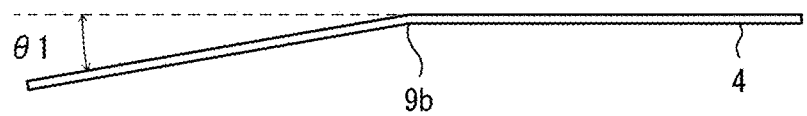
Figure 3:
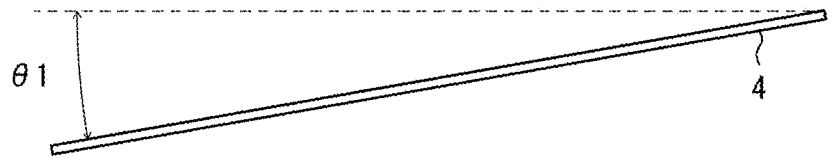
Figure 3:
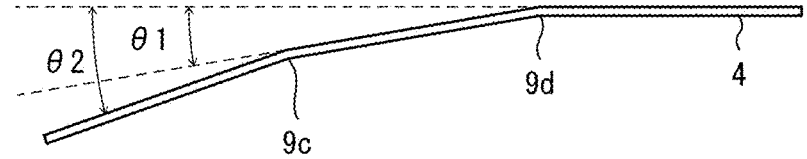
Figure 3:
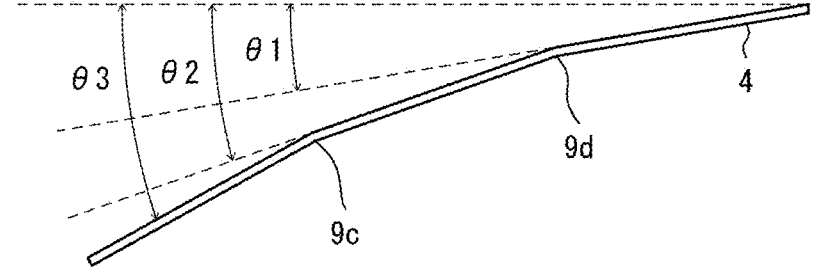
Figure 3:
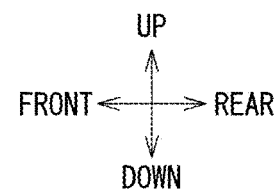

As illustrated in FIG. 3 as pattern 1B, it may be configured so that the plate member 4 is bent at at least one bent point 9a and slopes downward with respect to the horizontal plane. Since the slope angle θ1 is the same as that described for the pattern 1A of FIG. 2, the description thereof will be omitted. It is assumed that a section other than the sloping section of the entire plate member 4 is disposed parallel to the horizontal plane along the ceiling 1 of the vehicle 10; however, some bus may have a curved ceiling 1. When the ceiling 1 is curved, the section other than the sloping section of the entire plate member 4 may be disposed to make a curve along the ceiling 1. That is, the section other than the sloping section of the entire plate member 4 need not necessarily be disposed parallel to the horizontal plane.

Further, the position of the bent point 9a is not limited to the position illustrated in FIG. 3 as the pattern 1B. For example, as illustrated in FIG. 3 as pattern 2B, a bent point 9b may be formed to bend the plate member 4 at the center.

Alternatively, as illustrated in FIG. 3 as pattern 3B, it may be configured so that the plate member 4 slopes at a slope angle θ1 without being bent.

Alternatively, as illustrated in FIG. 3 as pattern 4B, it may be configured so that the plate member 4 has two bent points 9c and 9d so as to be bent at different angles at the bent points 9c and 9d. In this case, a slope angle θ2 with respect to the horizontal plane at the bent point 9c is greater than a slope angle θ1 with respect to the horizontal plane at the bent point 9d. In the pattern 4B, the section other than the sloping sections of the entire plate member 4 is arranged parallel to the horizontal plane along the ceiling 1 of the vehicle 10.

Alternatively, as illustrated in FIG. 3 as pattern 5B, it may be configured so that the plate member 4 has two bent points 9c and 9d so as to be bent at different angles at the bent points 9c and 9d, and has no section arranged parallel to the horizontal plane. In this case, a slope angle θ3 with respect to the horizontal plane at the bent point 9c is greater than a slope angle θ2 with respect to the horizontal plane at the bent point 9d. The slope angle θ2 relative to the horizontal plane at the bent point 9d is greater than a slope angle θ1 with respect to the horizontal plane.

Advantageous Effects

As described in the foregoing, with the vehicle 10 (an example of the mobile object) having the internal structure in accordance with the present embodiment, it is possible to achieve the following advantageous effects.

With the vehicle 10 having the internal structure described above, the plate-shaped plate members 4a to 4f or the plate-shaped plate member 4 capable of showing an image projected thereon are disposed along the ceiling 1 of the vehicle 10. The plurality of seats 3a to 3e are disposed in the vehicle 10 such that the height with respect to the horizontal plane gradually increases in a first direction. At least one of the plate members 4a to 4f or at least a part of the plate member 4 slopes downward with respect to the horizontal plane in a second direction opposite to the first direction. As used herein, an example of the "first direction" is the rearward direction of the vehicle 10, and an example of the "second direction opposite to the first direction" is the frontward direction of the vehicle 10.

According to this configuration, each of the passengers seated on the respective seats 3a to 3e can view an image projected on the plate members 4a to 4f or the plate member 4 disposed along the ceiling 1 at a comfortable neck angle even in a normal seating state, that is, without tilting the seat 3a to 3e largely or at all; this enables the passengers to view images while traveling.

Further, since it is possible to enable the passengers to view images projected on the plate members 4a to 4f or the plate member 4 disposed along the ceiling 1 without tilting the seats 3a to 3e large or at all, it is unnecessary to leave spaces for tilting the seats 3a to 3e. This makes it possible to install a large number of seats, enabling to utilize this invention under conditions where the number of passengers is large. That is, it becomes possible to have a large number of passengers on board, and it can also contribute economically.

Further, since at least one of the plate members 4a to 4f or at least a part of the plate member 4 is configured to slope, it is possible to produce a visual effect that makes it seem as if the image is coming up towards the passengers looking at the front of the vehicle 10. This makes it possible to provide the passengers with more immersive images.

It should be noted that the "horizontal plane" of the "height with respect to the horizontal plane" may be referred to as a floor surface or a first horizontal plane. In addition, the "horizontal plane" of "slope downward with respect to the horizontal plane" may be referred to as a ceiling surface or a second horizontal plane. The position of the first horizontal plane in the vertical direction is lower than that of the second horizontal plane in the vertical direction.

Further, when the vehicle 10 has the internal structure in which the plurality of plate members 4a to 4f are continuously provided along the ceiling 1, among the plate members, at least the foremost plate member 4a located at the foremost position in the frontward direction of the vehicle 10 may slope downward with respect to the horizontal plane (see the patterns 1A and 2A of FIG. 2). Further, when the vehicle 10 has the internal structure in which the single plate member 4 is provided, the plate member 4 may be bent at at least one bent point 9a or 9b and may slope downward with respect to the horizontal plane (see the patterns 1B and 2B of FIG. 3).

With these configurations, the passengers can also view an image at a comfortable neck angle; this enables the passengers to view images while traveling.

Further, when the vehicle 10 has the internal structure in which the plurality of plate members 4a to 4f are continuously provided along the ceiling 1, all the plate members 4a to 4f may slope downward with respect to the horizontal plane (see the pattern 3A of FIG. 2). Further, when the vehicle 10 has the internal structure in which the single plate member 4 is provided, the plate member 4 may slope downward with respect to the horizontal plane without being bent (see the pattern 3B of FIG. 3).

With these configurations in which all the plate members 4a to 4f or the entirety of the plate member 4 slope, the passengers can also view an image at a comfortable neck angle; this enables the passengers to view images while traveling.

Further, when the vehicle 10 has the internal structure in which the plurality of plate members 4a to 4f are provided, and when one or more of the plate members 4a to 4f which include at least the foremost plate member 4a located at the foremost position in the frontward direction of the vehicle 10 are referred to as a first plate member group, and one or more of the plate members 4a to 4f which are adjacent to the first plate member group are referred to as a second plate member group, the first plate member group and the second plate member group may slope downward with respect to the horizontal plane. A slope angle of the first plate member group with respect to the horizontal plane may be greater than a slope angle of the second plate member group with respect to the horizontal plane (see the pattern 4A in FIG. 2). Further, when the vehicle 10 has the internal structure in which the single plate member 4 is provided, the single plate member 4 may be bent at two bent points 9c and 9d and slope downward with respect to the horizontal plane. When the two bent points 9c and 9d are a first bent point and a second bent point arranged in this order in the frontward direction of the vehicle 10, a slope angle with respect to the horizontal plane at the first bent point is greater than a slope angle with respect to the horizontal plane at the second bent point (see the pattern 4B in FIG. 3). Here, an example of the "first plate member group" is a group including two plate members 4a and 4b illustrated in FIG. 2 as the pattern 4A, and an example of the "second plate member group" is a group including two plate members 4c and 4d illustrated in FIG. 2 as the pattern 4A. Here, the "first plate member group" may be constituted by a single plate member, and the "second plate member group" may also be constituted by a single plate member.

According to the foregoing configuration, since the angle changes in the middle of the surface on which an image is projected, it is possible to produce a visual effect that makes it seem as if the spaces are switched. This makes it possible to bring a new experience to the passengers.

Other Embodiments

Figure 4:
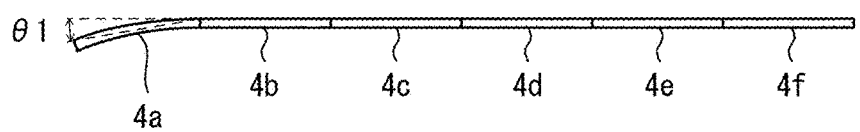
FIG. 4 is a diagram illustrating another example of the slope pattern of the plate members.
Figure 4:
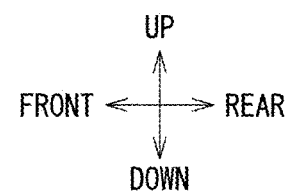

In the foregoing embodiment, the descriptions are made for the case of the plate members 4a to 4f or the plate member 4 configured to have a planar surface on which an image is projected by the projector 6. For example, as illustrated in FIG. 4, the plate member 4a sloping downward with respect to the horizontal plane may have a curved surface instead of a planar surface. Even when the plate member is a single plate member 4, a portion sloping downward with respect to the horizontal plane may have a curved surface shape. Thus, even in a case where the surface on which an image is projected by the projector 6 has a curved surface shape, the passengers can view the image at a comfortable neck angle; this enables the passengers to view images while traveling.

In the above embodiment, an example has been described in which at least one of the plate members 4a to 4f or at least a part of the plate member 4 is made to slope by using the support member 5; however, the sloping method is not limited to the method using the support member 5. For example, by providing an extendable frame between the rails and the at least one of the plate members 4a to 4f or the at least a part of the plate member 4, and by extending the frame, at least one of the plate members 4a to 4f or at least a part of the plate member 4 may be made to slope. Alternatively, at least one of the plate members 4a to 4f or at least a part of the plate member 4 may be made to slope by using a well-known mechanism combining a gear and a link. Alternatively, at least one of the plate members 4a to 4f or at least a part of the plate member 4 may be made to slope by using a bracket.

In the above embodiment, an example has been described in which the seat 3a to 3e are arranged such that the seated passengers face to the front of the vehicle 10, but is not limited thereto. In contrast, for example, the seats 3a to 3e may be arranged such that the seated passengers face to the rear of the vehicle 10. In this case, the seats 3a to 3e may be disposed on the floor surface 2 inside the vehicle 10 such that the height with respect to the horizontal plane gradually increases in the frontward direction of the vehicle 10. Then, at least one of the plate members 4a to 4f or at least a part of the plate member 4 may be configured to slope downward with respect to the horizontal plane in the rearward direction of the vehicle 10. With this configuration, when the seats 3a to 3e are disposed such that the seated passengers faces to the rear of the vehicle 10, the passengers can view an image at a comfortable neck angle; this enables the passengers to view images while traveling.

The present disclosure is not limited to the above embodiments, but can be altered by a person skilled in the art within the scope of the claims. The present invention also encompasses, in its technical scope, any embodiment derived by combining technical means disclosed in the embodiments.

REFERENCE SIGNS LIST

1 Ceiling
3a to 3e Seats
4, 4a to 4f Plate members
10 Vehicle

The invention claimed is:

1. A mobile object comprising:
a plate-shaped plate member disposed along a ceiling of the mobile object, the plate member being capable of showing an image projected thereon, the plate member having a planar surface;
a support member disposed between the ceiling and the plate member, wherein the support member is positioned such that at least a part of the plate member slopes downward with respect to the horizontal plane in a second direction opposite to the first direction; and
a plurality of seats disposed such that a height with respect to a horizontal plane gradually increases in a first direction,
wherein:
the plate member is a plurality of plate members, one or more of the plate members, which include at least a foremost plate member located at a foremost position in the second direction, are referred to as a first plate member group, one or more of the plate members. which are adjacent to the first plate member group, are referred to as a second plate member group, the first plate member group and the second plate member group slope downward with respect to the horizontal plane, and a slope angle of the first plate member group with respect to the horizontal plane is greater than a slope angle of the second plate member group with respect to the horizontal plane; or
the plate member is a single plate member, the single plate member is bent at two bent points and slopes downward with respect to the horizontal plane, and the two bent points are a first bent point and a second bent point arranged in this order in the second direction, a slope angle with respect to the horizontal plane at the first bent point is greater than a slope angle with respect to the horizontal plane at the second bent point.

2. The mobile object according to claim 1, wherein the first direction is a rearward direction of the mobile object, and the second direction is a frontward direction of the mobile object.

3. The mobile object according to claim 1, wherein
the plate member is the plurality of plate members, one or more of the plate members, which are adjacent to the second plate member group at a position opposite the first plate member group, are referred to as a third plate member group,
the first plate member group, the second plate member group, and the third plate member group slope downward with respect to the horizontal plane, and
the slope angle of the second plate member group with respect to the horizontal plane is greater than a slope angle of the third plate member group with respect to the horizontal plane.

4. A mobile object comprising:
a plate-shaped plate member disposed along a ceiling of the mobile object, the plate member being capable of showing an image projected thereon, the plate member having a planar surface;
a support member disposed between the ceiling and the plate member, wherein the support member is positioned such that at least a part of the plate member slopes downward with respect to the horizontal plane in a second direction opposite to the first direction; and
a plurality of seats disposed such that a height with respect to a horizontal plane gradually increases in a first direction,
wherein
the plate member is a plurality of plate members, one or more of the plate members, which include at least a foremost plate member located at a foremost position in the second direction, are referred to as a first plate member group,
one or more of the plate members, which are adjacent to the first plate member group, are referred to as a second plate member group,
one or more of the plate members, which are adjacent to the second plate member group at a position opposite the first plate member group, are referred to as a third plate member group,
the first plate member group, the second plate member group, and the third plate member group slope downward with respect to the horizontal plane,
a slope angle of the first plate member group with respect to the horizontal plane is greater than a slope angle of the second plate member group with respect to the horizontal plane, and
the slope angle of the second plate member group with respect to the horizontal plane is greater than a slope angle of the third plate member group with respect to the horizontal plane.

5. The mobile object according to claim 4, wherein the first direction is a rearward direction of the mobile object, and the second direction is a frontward direction of the mobile object.

* * * * *